United States Patent
Lee et al.

(10) Patent No.: US 8,214,389 B2
(45) Date of Patent: Jul. 3, 2012

(54) COMMON ARCHITECTURE FOR ADMINISTRATION OF CLIENT SIDE PROPERTY SETTINGS IN A DISTRIBUTED AND HETEROGENEOUS ENVIRONMENT

(75) Inventors: Bilung Lee, Fremont, CA (US); Paul Arnold Ostler, Yakima, WA (US)

(73) Assignee: International Business Machines Corporation, Armonk, NY (US)

(*) Notice: Subject to any disclaimer, the term of this patent is extended or adjusted under 35 U.S.C. 154(b) by 381 days.

(21) Appl. No.: 12/418,410

(22) Filed: Apr. 3, 2009

(65) Prior Publication Data
US 2010/0257200 A1    Oct. 7, 2010

(51) Int. Cl.
*G06F 17/30* (2006.01)
(52) U.S. Cl. ......................... 707/770; 707/792
(58) Field of Classification Search .................. 707/100, 707/792; 717/121, 117, 113
See application file for complete search history.

(56) References Cited

U.S. PATENT DOCUMENTS

| | | | |
|---|---|---|---|
| 5,721,904 A | 2/1998 | Ito et al. | |
| 5,838,918 A | 11/1998 | Prager et al. | |
| 6,029,196 A | 2/2000 | Lenz | |
| 6,189,000 B1 * | 2/2001 | Gwertzman et al. | 1/1 |
| 6,252,858 B1 | 6/2001 | Inoue | |
| 6,256,676 B1 | 7/2001 | Taylor et al. | |
| 6,308,178 B1 | 10/2001 | Chang et al. | |
| 6,687,698 B1 | 2/2004 | Nixon et al. | |
| 6,732,360 B1 | 5/2004 | Seo et al. | |
| 7,065,746 B2 | 6/2006 | Szabo et al. | |
| 7,076,766 B2 * | 7/2006 | Wirts et al. | 717/121 |
| 7,143,101 B2 | 11/2006 | Oliver et al. | |
| 7,150,037 B2 | 12/2006 | Wolf et al. | |
| 7,171,458 B2 | 1/2007 | Brown et al. | |
| 7,305,613 B2 * | 12/2007 | Oezgen | 707/715 |
| 7,404,195 B1 * | 7/2008 | Sawicki et al. | 719/328 |
| 7,577,938 B2 * | 8/2009 | Bent et al. | 717/113 |
| 7,593,956 B1 | 9/2009 | Yakovlev | |

(Continued)

FOREIGN PATENT DOCUMENTS
WO    WO 03090021 A2    10/2003

OTHER PUBLICATIONS

U.S. Appl. No. 12/025,981, filed Feb. 5, 2008, Chang et al.

(Continued)

*Primary Examiner* — James Trujillo
*Assistant Examiner* — Thong Vu
(74) *Attorney, Agent, or Firm* — Rabindranath Dutta; Konrad Raynes & Victor LLP

(57) ABSTRACT

According to one embodiment of the present invention, a system, method and computer program product or the administration of client side property settings in a distributed and heterogeneous environment is provided. According to one embodiment of the present invention, a method comprises establishing communication between a plurality of property agents and a property service, and looking up an identifier in a property repository for each property agent. A property setting in an updated client application associated with a selected one of the property agents is then modified by a database administrator. Changed property settings from the selected one of the property agents are then sent to the property service. Property settings associated with the updated client application are updated in the property repository. The updated property settings are sent from the property service to a plurality of property agents. The property agents may then merge the updated property settings into an associated application.

20 Claims, 4 Drawing Sheets

U.S. PATENT DOCUMENTS

| | | | |
|---|---|---|---|
| 7,665,064 B2 * | 2/2010 | Able et al. | 717/117 |
| 7,689,564 B2 * | 3/2010 | Deen et al. | 707/999.01 |
| 7,827,201 B1 * | 11/2010 | Gordon et al. | 707/792 |
| 7,870,188 B2 * | 1/2011 | Mazzitelli et al. | 709/203 |
| 2003/0065670 A1 * | 4/2003 | Bisson et al. | 707/100 |
| 2003/0132956 A1 | 7/2003 | Duncan et al. | |
| 2003/0135505 A1 | 7/2003 | Hind et al. | |
| 2003/0172368 A1 | 9/2003 | Alumbaugh et al. | |
| 2003/0200209 A1 | 10/2003 | Smith et al. | |
| 2003/0204505 A1 | 10/2003 | Cotner et al. | |
| 2004/0006549 A1 | 1/2004 | Mullins et al. | |
| 2004/0044699 A1 | 3/2004 | He | |
| 2004/0230571 A1 | 11/2004 | Robertson | |
| 2005/0055325 A1 | 3/2005 | Dutt et al. | |
| 2005/0060169 A1 | 3/2005 | Gangadharan et al. | |
| 2005/0066155 A1 | 3/2005 | Dutt et al. | |
| 2005/0181874 A1 | 8/2005 | Bond | |
| 2005/0205074 A1 | 9/2005 | Gibson et al. | |
| 2005/0210060 A1 | 9/2005 | Borchers | |
| 2005/0228874 A1 | 10/2005 | Edgett et al. | |
| 2005/0234947 A1 | 10/2005 | Minder et al. | |
| 2005/0289177 A1 | 12/2005 | Hohmann, II et al. | |
| 2006/0017969 A1 * | 1/2006 | Ly et al. | 358/1.15 |
| 2006/0179042 A1 | 8/2006 | Bram et al. | |
| 2006/0265385 A1 | 11/2006 | Agrawal et al. | |
| 2007/0299822 A1 | 12/2007 | Jopp et al. | |
| 2009/0199211 A1 | 8/2009 | Chang et al. | |

OTHER PUBLICATIONS

Amendment 1, Jul. 5, 2011, for U.S. Appl. No. 12/025,981, Total 14 pp.

Final Office Action 1, Aug. 17, 2011, for U.S. Appl. No. 12/025,981, Total 23 pp.

Amendment 2, Oct. 17, 2011, for U.S. Appl. No. 12/025,981, filed Feb. 5, 2008 by D.W. Chang et al., Total 9 pp. [57.219 (Amend2)].

Notice of Allowance 1, Nov. 2, 2011, for U.S. Appl. No. 12/025,981, filed Feb. 5, 2008, by D.W. Chang et al., Total 13 pp. [57.219 (NOA1)].

Office Action 1, Apr. 5, 2011, for U.S. Appl. No. 12/025,981, Total 23 pp.

White, J., D.C. Schmidt, K. Czarnecki, C. Wienands, G. Lenz, E. Wuchner, and L. Fiege, "Automated Model-based Configuration of Enterprise Java Applications", 11th IEEE International Enterprise Distributed OBject Computing Conference, © 2007 IEEE, Total 12 pp.

Amendment 3, Apr. 6, 2012, for U.S. Appl. No. 12/025,981, filed on Feb. 5, 2008 by D.W. Chang et al., Total 10 pp. [57.219 (Amend3)].

Notice of Allowance 2, Apr. 12, 2012, for U.S. Appl. No. 12/025,981, filed on Feb. 5, 2008 by D.W. Chang et al., Total 15 pp. [57.219 (NOA2)].

* cited by examiner

COMMON ARCHITECTURE FOR ADMINISTRATION OF CLIENT SIDE PROPERTY SETTINGS IN A DISTRIBUTED AND HETEROGENEOUS ENVIRONMENT

BACKGROUND

The present invention relates to database systems, and more specifically, to the management of property settings in of multiple client applications communicating with a database server through different runtime mediums.

In a modern database system, a database server can be accessed remotely by a client application. One of the functions faced today by many database administrators is to effectively and efficiently manage the property settings of multiple client applications. This task is complicated in situations where multiple client applications may be communicating with the database server in a heterogeneous environment, that is, via a variety of different runtime mediums. The different runtime mediums may include, for example, different database drivers, application servers, and tooling utilities. In such situations, under an enterprise environment, it is nontrivial to keep all property settings consistent across a large number of various client applications.

For example, a database administrator may need to change a property setting of a client application from time to time. It is a challenge to deploy this change over all of the distributed and heterogeneous environment. One common solution is to define certain SQL tables on the database server such that they can be shared, queried, and updated by the client applications. Another existing solution is that, as part of Java Database Connectivity (JDBC), property settings can be managed via standard data sources.

SUMMARY

According to one embodiment of the present invention, a method comprises: establishing communication between a plurality of property agents and a property service; looking up an identifier in a property repository for each property agent; modifying a property setting in an updated client application associated with a selected one of the property agents; sending changed property settings from the selected one of the property agents to the property service; updating property settings associated with the updated client application in the property repository; sending the updated property settings from the property service to a plurality of property agents; and using the property agents to merge the updated property settings into an associated application.

According to another embodiment of the present invention, a method comprises: establishing communication between a plurality of property agents and a property service, each property agent being associated with an application, the communication being established under a logical name associated with the property agent; looking up a namespace in a property repository for each property agent based on the logical name; modifying a property setting in an updated client application associated with a selected one of the property agents, the modifying being performed by a database administrator; sending changed property settings from the selected one of the property agents to the property service; updating property settings associated with the updated client application in the property repository; sending the updated property settings to a plurality of property agents; using the property agents to merge the updated property settings into an associated application; and using the updated property settings to connect the application to a respective database server.

According to a further embodiment of the present invention, a system comprises: a plurality of client applications; a property repository storing property settings for a plurality of the client applications; a property service for transferring property settings between the client applications and the property repository; and a plurality of property agents, each associated with one of the client applications, for sending pull-up requests to the property service to update the property repository, wherein the property service sends push-down events with updated property settings to selected ones of the property agents.

According to a further embodiment of the present invention, a system comprises: a plurality of client applications; a property repository storing property settings for a plurality of the client applications; a property service for transferring property settings between the client applications and the property repository; a plurality of property agents, each associated with one of the client applications, for sending pull-up requests to the property service to update the property repository, wherein the property service sends push-down events with updated property settings to selected ones of the property agents; and a database server connected to the client applications, wherein the client applications user the property settings in connecting to said database server.

According to another embodiment of the present invention, a computer program product for the administration of client side property settings comprises: a computer usable medium having computer usable program code embodied therewith, the computer usable program code comprising: computer usable program code configured to: establish communication between a plurality of property agents and a property service; look up an identifier in a property repository for each property agent; modify a property setting in an updated client application associated with a selected one of the property agents; send changed property settings from the selected one of the property agents to the property service; update property settings associated with the updated client application in the property repository; send the updated property settings from the property service to a plurality of property agents; and use the property agents to merge the updated property settings into an associated application.

DETAILED DESCRIPTION

Embodiments of the invention provide a system, method and computer program product for the administration of client side property settings in a distributed and heterogeneous environment. These embodiments address the need for a database administrator to change a property setting of a client application over an entire distributed and heterogeneous environment. One prior solution was to define certain SQL tables on the database server such that they can be shared, queried, and updated by the client applications. However, this approach imposes additional burdens on the database administrators to manage those SQL tables.

Another prior existing solution to the above-described problem of administering client side property settings is to manage property settings via standard data sources, as part of the Java Database Connectivity (JDBC). Even though this approach may provide convenience to administer property settings through the Java Naming and Directory Interface (JNDI), it introduces another set of problems. First of all, this approach is too Java-specific and thus cannot be easily applied to other language domains. In addition, any changes to a data source can be propagated only to those new connections after changes happen. Furthermore, JNDI configuration can be burdensome and may be overkill for certain client applications.

In contrast to the prior art, embodiments of the present invention does not impose additional burdens on database administrators. Embodiments of the present invention have a number of desirable features. A common architecture is used that is not tied to any specific language application domains. The architecture is heterogeneous so that it is applicable to various client applications, which may be via a variety of runtime mediums, such as database drivers, application servers, and tooling utilities. The architecture is distributed in that it facilitates deployment of property settings from a client application to other client applications in a distributed environment. Also, each client application is enabled to utilize a particular set of property settings under a specific namespace. Further, a backend repository of property settings is provided that is transparent to all client applications, thus alleviating the burden to be explicitly maintained. In addition, the property settings in the backend repository can be used for overriding the property settings in a client application. To provide a default setting, the property settings in the backend repository can also be used to fill in the property settings that are not yet set in a client application. Further, the architecture is extensible in that it leverages module-based components, which can be plugged into a variety of client applications. For example, a Graphical User Interface (GUI) can be built within the architecture to provide an administration tooling utility.

Figure 1:
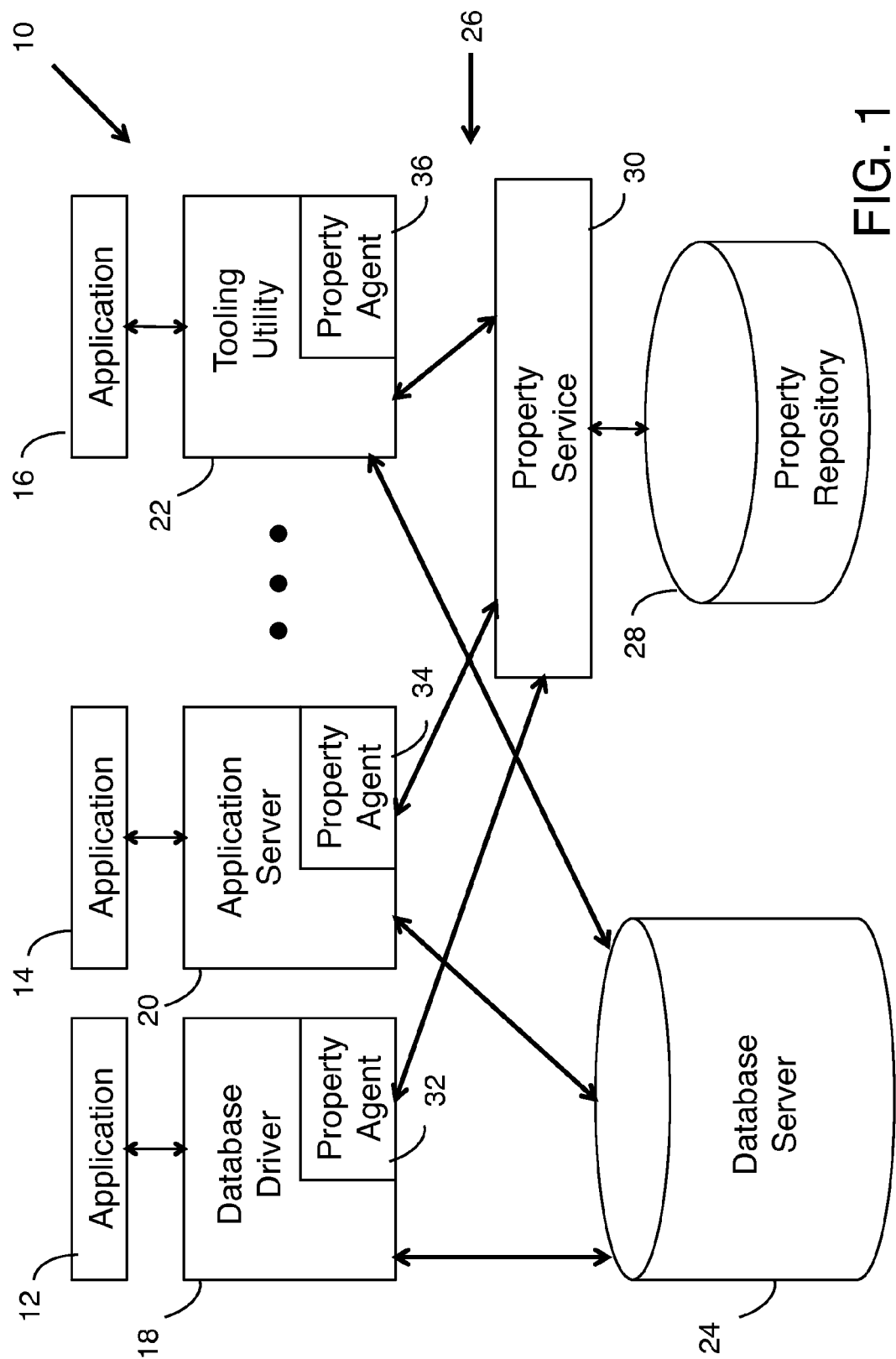
FIG. 1 shows a diagram of a database system, in accordance with an embodiment of the invention.

As shown in FIG. 1, embodiments of the invention provide a common architecture for a database system 10 for effective and efficient administration of property settings across distributed and heterogeneous client applications. As shown in FIG. 1, the database system 10 includes a plurality of client applications 12, 14 and 16. While only 3 client applications 12 are shown in FIG. 1, it will be appreciated that any number of client applications 12 may be employed. Each client application 12 is connected to a runtime medium. In the embodiment shown, a distributed and heterogeneous environment exists with different types of runtime mediums, such as a database driver 18, an application server 20 and a tooling utility 22. Each runtime medium 18, 20 and 22, are connected to a database server 24.

Embodiments of the invention include a common architecture 26 for property setting that includes a property repository 28, which serves as a central storage for property settings across the distributed and heterogeneous client applications. The property settings are organized under different namespaces, each of them indexed by a logical name. The storage infrastructure of the common architecture 26 is transparent to the client applications 12, 14 and 16, and, as a result, can be built on top of any persistent system, such as a relational database 24, or a file system.

The common architecture 26 includes a property service unit 30 that provides access management to the backend property repository. The property service 30 looks up a namespace in the property repository 28, pushes down the property settings from the property repository 28 to the client applications 12, 14 and 16, and pulls up the property settings from the client applications to the property repository 28.

The common architecture 26 includes property agents 32, 34 and 36, which are located in the runtime medium, such as 18, 20 and 22 respectively. The property agents 32, 34 and 36, communicate with the property service 30 based on a logical namespace on behalf of the client applications 12, 14 and 16. The property agents 32, 34 and 36 send pull-up requests to the property service 30 for the property repository 28 to update. The property service 30 sends "push-down events" to the property agents 32, 34 and 36 that have registered to listen for updates in a logical namespace (see block 50 in FIG. 2 below). These push-down events contain those properties and respective values that have been updated by an administrator in the logical namespace of the repository 28.

Figure 2:
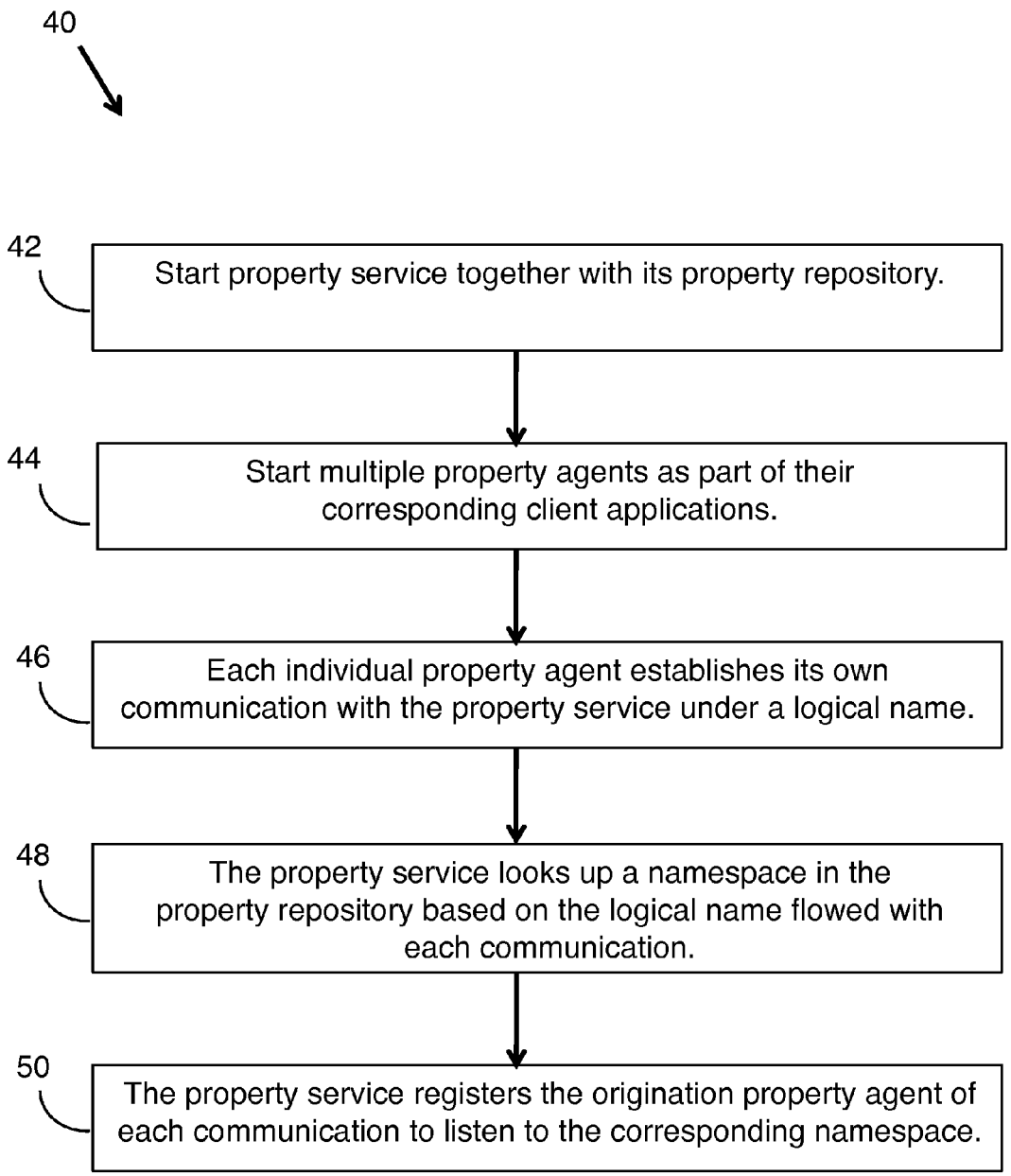
FIG. 2 shows a flowchart of a set-up process for the administration of client side property settings in a distributed and heterogeneous environment, such as the database system shown in FIG. 1, in accordance with an embodiment of the invention.

FIG. 2 shows a flow chart of a set-up process 40 for the administration of client side property settings in a distributed and heterogeneous environment, such as the database system 10 shown in FIG. 1, in accordance with an embodiment of the invention. The process 40 begins by starting a property service, such as property service 30 together with its property repository, such as property repository 28, in block 42. In block 44, multiple property agents are started as part of their corresponding client applications. In block 46, each individual property agent establishes its own communication with the property service under a logical name. In block 48, the property service looks up a namespace in the property repository based on the logical name flowed with each communication. The property service registers the originating property agent of each communication to listen to the corresponding namespace, in block 50.

Figure 3:
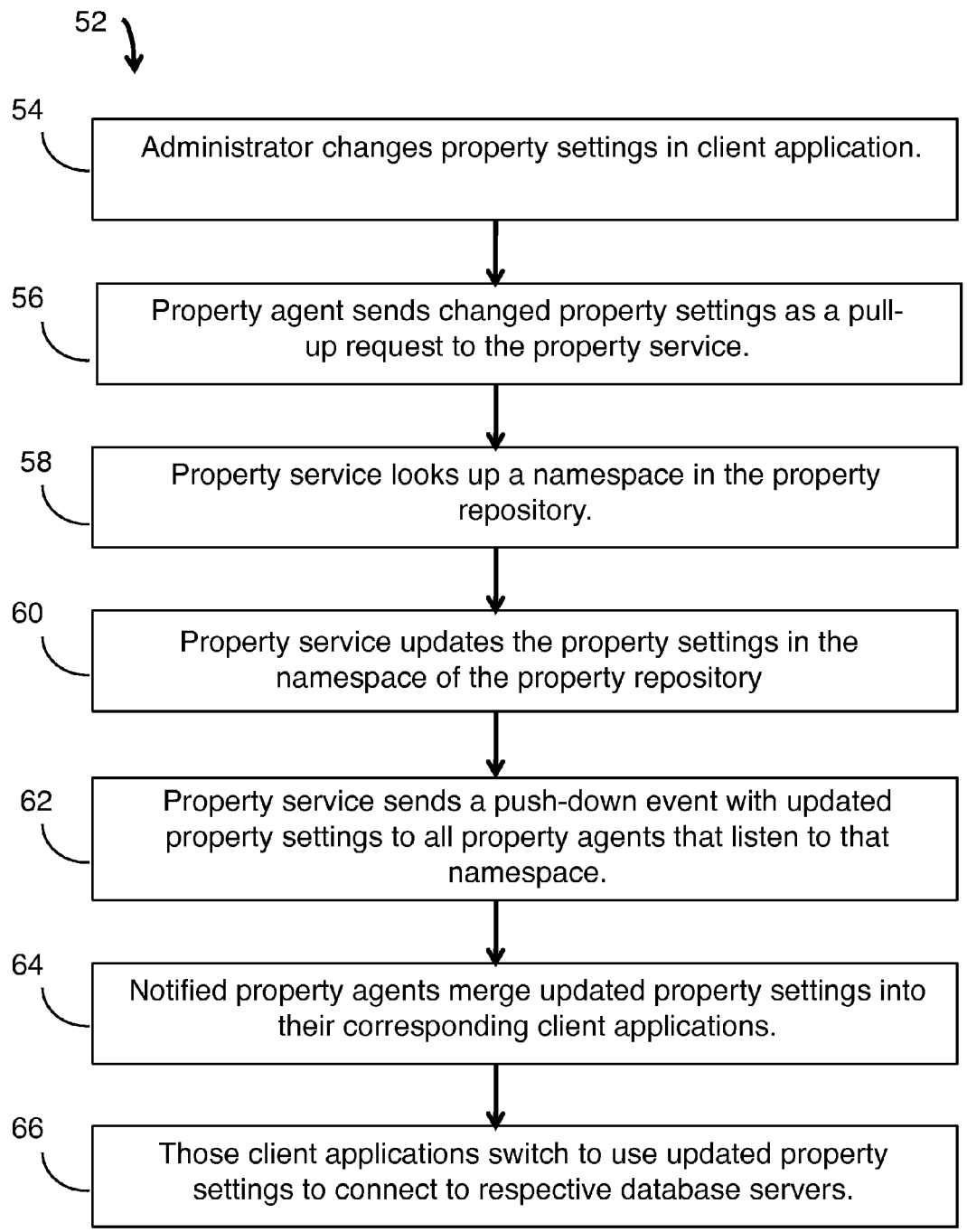
FIG. 3 shows a flowchart of an update process for the administration of client side property settings in a distributed and heterogeneous environment, such as the database system shown in FIG. 1, in accordance with an embodiment of the invention.

FIG. 3 shows a flowchart of an update process for the administration of client side property settings in a distributed and heterogeneous environment, such as the database system shown in FIG. 1, in accordance with an embodiment of the invention. In block 52, a database administrator changes certain property settings in one of the client applications. The property agent of that client application sends changed property settings under a logical name as a pull-up request to the property service, in block 54. The property service looks up a namespace in the property repository based on the logical name, in block 58. In block 60, the property service updates the property settings in the namespace of the property repository. In block 62, the property service sends a push-down event with updated property settings to all property agents that listen to that namespace. Notified property agents merge updated property settings into their corresponding client applications, in block 64. In block 66, those client applications switch to use updated property settings to connect to respective database servers.

As can be seen from the above disclosure, embodiments of the invention provide a system, method and computer program product for the administration of client side property settings in a distributed and heterogeneous environment. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
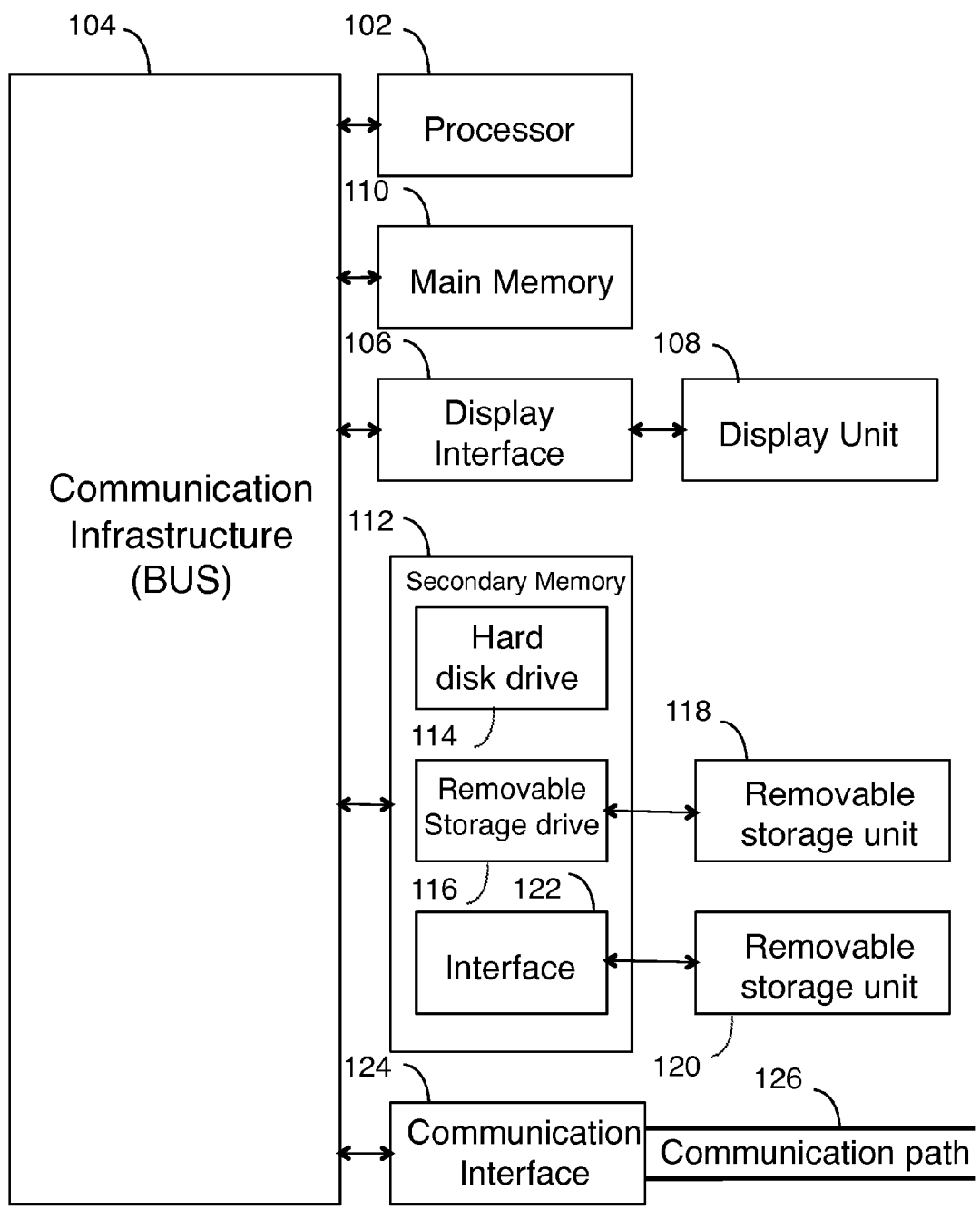
FIG. 4 shows a high level block diagram of an information processing system useful for implementing one embodiment of the present invention.

FIG. 4 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   establishing communication between a plurality of property agents and a property service;
   looking up an identifier in a property repository for each property agent, wherein said identifier is a namespace;
   modifying a property setting in an updated client application associated with a selected one of said property agents;
   sending changed property settings from said selected one of said property agents to said property service;
   updating property settings associated with said updated client application in said property repository;
   sending said updated property settings from said property service to a plurality of property agents, wherein sending said property settings from said property service comprises sending a push-down event with said updated property settings to selected ones of said property agents that listen to said namespace; and
   using said property agents to merge said updated property settings into an associated application.

2. A method according to claim 1 wherein said client applications use said updated property settings to connect to a respective database server.

3. A method according to claim 2 wherein said sending changed property settings from said selected one of said property agents comprises sending changed property settings under a logical name as a pull-up request to said property service.

4. A method according to claim 3 further comprising looking up said namespace in said property repository based on said logical name.

5. A method according to claim 4 wherein said updating comprises updating property settings in said namespace of said property repository.

6. A method according to claim 1 wherein said updating is performed by a database administrator.

7. A method comprising:
   establishing communication between a plurality of property agents and a property service, each property agent being associated with an application, said communication being established under a logical name associated with said property agent;
   looking up a namespace in a property repository for each property agent based on said logical name;
   modifying a property setting in an updated client application associated with a selected one of said property agents, said modifying being performed by a database administrator;
   sending changed property settings from said selected one of said property agents to said property service;

updating property settings associated with said updated client application in said property repository;

sending said updated property settings to a plurality of property agents, wherein sending said sending property settings from said property service comprises sending a push-down event with said updated property settings to selected ones of said property agents that listen to said namespace;

using said property agents to merge said updated property settings into an associated application; and using said updated property settings to connect said application to a respective database server.

8. A method according to claim 7 said sending changed property settings from said selected one of said property agents comprises sending changed property settings under a logical name as a pull-up request to said property service.

9. A system comprising:
one or more processors;
a plurality of client applications executing in said one or more processors;
a property repository storing property settings for a plurality of said client applications;
a property service for transferring property settings between said client applications and said property repository; and
a plurality of property agents, each associated with one of said client applications, for sending pull-up requests to said property service to update said property repository, wherein said property service sends push-down events with updated property settings to selected ones of said property agents, wherein sending said updated property settings from said property service comprises sending a push-down event with said updated property settings to selected ones of said property agents that listen to a namespace.

10. A system according to claim 9 wherein said client applications are a set of distributed heterogeneous client applications.

11. A system according to claim 10 wherein said client applications include a database driver and an application server.

12. A system comprising:
one or more processors;
a plurality of client applications executing in said one or more processors;
a property repository storing property settings for a plurality of said client applications;
a property service for transferring property settings between said client applications and said property repository; and
a plurality of property agents, each associated with one of said client applications, for sending pull-up requests to said property service to update said property repository, wherein said property service sends push-down events with updated property settings to selected ones of said property agents, wherein sending said updated property settings from said property service comprises sending a push-down event with said updated property settings to selected ones of said property agents that listen to a namespace.

13. A system according to claim 10 wherein said property settings in said property repository are organized under different namespaces.

14. A system according to claim 13 wherein said namespaces are organized by a logical name.

15. A system according to claim 10 further comprising a database server connected to said client applications, wherein said client applications uses said property settings in connecting to said database server.

16. A computer program product for the administration of client side property settings, said computer program product comprising:
a computer readable medium included in a storage unit, said computer readable medium having computer readable program code embodied therewith, said computer readable program code configured to:
establish communication between a plurality of property agents and a property service;
look up an identifier in a property repository for each property agent, wherein said identifier is a namespace;
modify a property setting in an updated client application associated with a selected one of said property agents;
send changed property settings from said selected one of said property agents to said property service;
update property settings associated with said updated client application in said property repository;
send said updated property settings from said property service to a plurality of property agents, wherein sending said property settings from said property service comprises sending a push-down event with said updated property settings to selected ones of said property agents that listen to said namespace; and
use said property agents to merge said updated property settings into an associated application.

17. A computer program product according to claim 16 wherein said computer readable program code is further configured to use said updated property settings to connect said client applications to a respective database server.

18. A computer program product according to claim 17 wherein said computer readable program code is further configured to send changed property settings under a logical name as a pull-up request to said property service.

19. A computer program product according to claim 18 wherein said computer readable program code is further configured to look up said namespace in said property repository based on said logical name.

20. A system, comprising:
one or more memory;
one or more processors coupled to the one or more memory, wherein the one or more processors perform operations, the operations comprising:
establishing communication between a plurality of property agents and a property service;
looking up an identifier in a property repository for each property agent, wherein said identifier is a namespace;
modifying a property setting in an updated client application associated with a selected one of said property agents;
sending changed property settings from said selected one of said property agents to said property service;
updating property settings associated with said updated client application in said property repository;
sending said updated property settings from said property service to a plurality of property agents, wherein sending said property settings from said property service comprises sending a push-down event with said updated property settings to selected ones of said property agents that listen to said namespace; and
using said property agents to merge said updated property settings into an associated application.

* * * * *